May 12, 1959 V. R. EPPERSON 2,886,276
QUICK ACTION PAN-TILT TRIPOD HEAD
Filed Sept. 7, 1955
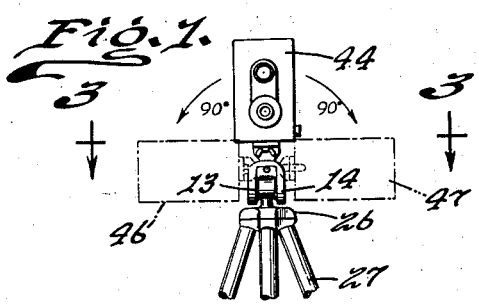
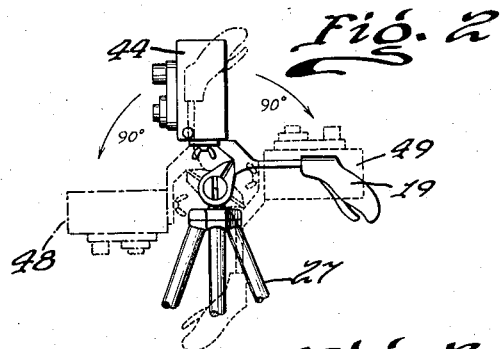
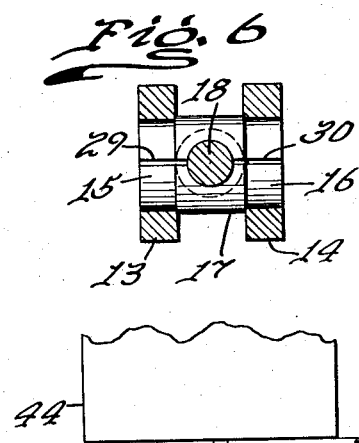
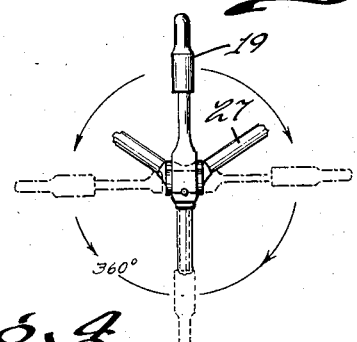
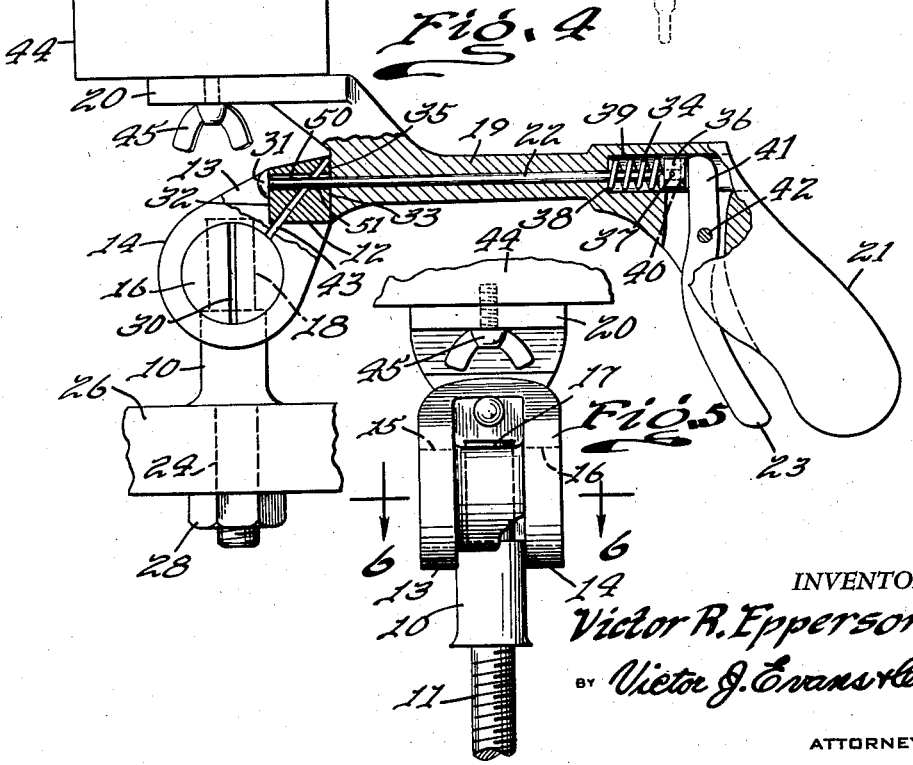
INVENTOR.
Victor R. Epperson
BY Victor J. Evans & Co.
ATTORNEYS

United States Patent Office 2,886,276
Patented May 12, 1959

---

2,886,276

QUICK ACTION PAN-TILT TRIPOD HEAD

Victor R. Epperson, Salt Lake City, Utah

Application September 7, 1955, Serial No. 532,865

2 Claims. (Cl. 248—183)

This invention relates to tripods for cameras particularly of the type having a swivel head wherein a camera is adapted to be tilted both laterally and longitudinally and also rotated about a vertical axis, and in particular, a tripod head having three movements, a rotary movement of 360 degrees about a vertical axis, a fore and aft or longitudinal movement of 180 degrees about a transversely disposed horizontal axis, and also a lateral or tilting movement of 180 degrees from side to side also about a horizontally disposed axis, and also in which the head is provided with a trigger action for clamping the parts in adjusted positions.

The purpose of this invention is to provide a universal head for a tripod and in particular a head in which the axis of a camera positioned thereon may be adjusted to a level position regardless of the position of the platform of the tripod.

Various types of devices have been provided for adjusting positions of cameras on tripods and wherein such devices provide movements of the camera in different directions the movements, and particularly the tilting action are limited to a comparatively few degrees. For certain types of photography it is desirable to turn the camera completely around and also completely over both laterally and longitudinally and this is substantially impossible with a conventional tripod.

With this thought in mind, this invention contemplates a tripod having a plurality of actions in the head wherein a camera positioned on the tripod is adapted to be turned completely around a vertical axis and is also adapted to be tilted both longitudinally and laterally through angles of 180 degrees.

The object of this invention is, therefore, to provide swivel or turning actions in the head of a tripod which permit a camera, positioned on the tripod to be adjusted to substantially any angle desired.

Another object of the invention is to provide a universal head for a tripod in which both the tripod and a camera positioned thereon may be of conventional construction.

A further object of the invention is to provide a tripod head having a universal action in which means is provided for adjusting a camera on the tripod to various positions and in which means is provided for clamping the elements in the adjusted positions in which the tripod head is of a simple and economical construction.

With these and other objects and advantages in view, the invention embodies a stud adapted to be secured by a nut in a conventional opening of a platform of a tripod, a clamp having bearings adapted to rotate on the ends of a trunnion carried by the stud and an arm having a trigger therein and on which a camera may be mounted secured to flanges extended upwardly from the clamp with a bolt and in which the bolt is adapted to be actuated by the trigger to clamp or release the mounting elements.

Other features and advantages of the invention will appear from the following description, taken in connection with the drawing, wherein:

Figure 1 is a front elevational view of the head of a tripod showin a camera positioned on the head, the camera being shown in a vertical position in full lines and in horizontally disposed positions in broken lines.

Figure 2 is a side elevational view of the tripod head with the parts as shown in Figure 1 showing the camera in an upright position in full lines and in forward and aft positions in broken lines.

Figure 3 is a plan view looking downwardly upon the upper end of the tripod taken on line 3—3 of Figure 1 and also showing a trigger action handle in one position in full lines and other radially disposed positions in broken lines.

Figure 4 is a side elevational view of the tripod head, similar to that shown in Figure 2, with the parts shown on an enlarged scale and with parts of the handle or grip broken away to show the clamping means therein.

Figure 5 is a front elevational view of the adjustable tripod head looking toward the end upon which the camera is positioned.

Figure 6 is a sectional plan through the longitudinal or fore and aft pivotal mounting taken on line 6—6 of Figure 5.

Referring now to the drawing, wherein like reference characters denote corresponding parts, the improved tripod head of this invention includes a stud or vertically disposed post 10 having a threaded portion or stud 11 extended from the lower end, a clamp 12 having bearings 13 and 14 pivotally mounted on trunnions 15 and 16 of a stud 17 in which a pin 18 extended upwardly from the post 10 is positioned and a handle 19 having a camera retaining platform 20 extended from one end and a grip 21 on the opposite end and through which a bolt 22 actuated by a trigger 23 extends.

The stud 11 of the post 10 extends through an opening 24 in a platform 26 to which legs 27 of a tripod are secured and the stud is retained in the platform with a nut 28 which is threaded on the lower end thereof.

The trunnions 15 and 16 are provided with vertically disposed slots 29 and 30.

One end of the bolt 22 is provided with a head 31 that bears against a surface 32 of the clamp 12 and an opposite surface 33 of the clamp is urged by a spring 34 against a surface 35 of the handle 19. The opposite end of the bolt 22 is provided with a round slotted nut 36 that is secured to the bolt with a pin 37 and the spring 34 is positioned between the nut 36 and a shoulder 38 at the end of a recess 39 in which the spring 34 is positioned. The nut 36 is engaged by a projection 40 on a head 41 of the trigger 23 whereby with the trigger pivotally mounted in the grip 21 with a pin 42 gripping action on the trigger 23 drives the bolt 22 forwardly relieving tension between the surfaces on both sides of the clamp member 12. The jaws or ends of the clamp 12 are separated with slots 43 whereby upon relieving the tension by drawing the lower end of the trigger 23 inwardly the gripping action of the bearings 13 and 14 on the trunnions 15 and 16 is also relieved.

With the parts assembled as illustrated and described, a camera 44 secured on the platform 20 of the handle 19 with a conventional thumb or wing nut 45 is adapted to be retained in a vertically disposed position as shown with the full lines in Figure 1 or tilted to positions indicated by the numerals 46 and 47 by actuating the trigger 23 to release the tension and twisting the handle or grip, and as illustrated in Figure 2, the camera may be moved forwardly from the position shown in full lines to the position indicated by the broken line 48 or moved rearwardly to the position indicated by the broken lines 49.

With the grip 21 held in the hand of the operator, the camera may also be turned through 360 degrees about the pin 18 extended upwardly from the post 10.

With the space 43 between ends of the bearings 13 and 14 positioned whereby the bolt 22 extends through an opening 50 in one side of the clamp and also through an opening 51 in the opposite side, the bearings are clamped on the trunnions by the bolt and spring and by the same means the surfaces 33 and 35 are frictionally held, providing means for clamping the camera in various adjusted positions.

It will be understood that modifications, within the scope of the appended claims, may be made in the design and arrangement of the parts without departing from the spirit of the invention.

What is claimed is:

1. In a tripod head, the combination which comprises a vertically disposed post having a threaded stud with a nut thereon extended from the lower end for mounting the head on a platform of a tripod, said post also having a vertically disposed pin extended from the upper end thereof, a horizontally disposed stud having oppositely extending trunnions on ends thereof rotatably mounted on the vertically disposed pin of the post, a clamp having a pair of relatively spaced split bearings embracing the pin and trunnions and adapted to rotate in a vertical plane in relation to the post, a handle having an end surface positioned against the outer surface of one side of the clamp, said handle extending laterally of said clamp in angular relation thereto and having a platform overlying the end surface of the handle and the corresponding surface of the clamp for mounting a camera thereon and also having an angularly downwardly extending grip on the extended end, a bolt extended through the handle and both sides of the clamp for rotatably mounting the handle on said clamp, a spring extended around the bolt and positioned in the handle for urging the end surface of the handle against the outer surface of said one side of the clamp and for engaging both sides of the clamp against the trunnions and stud, and a trigger pivotally mounted in the grip for compressing the spring to relieve the tension between the end surface of the handle and the outer surface of said one side of the clamp and also between the bearings of the clamp and trunnions to facilitate turning the handle in relation to the clamp and also to facilitate rotating the clamp on the trunnions of the post.

2. A tripod as in claim 1, wherein said horizontally disposed stud is split and provides clamping action on the vertically disposed pin and the compression of the spring by said trigger also relieves tension between the horizontally disposed stud on which the trunnions are mounted and the vertically disposed pin upon which the horizontally disposed stud is mounted.

References Cited in the file of this patent

UNITED STATES PATENTS

| 2,524,172 | Miller et al. | Oct. 3, 1950 |
| 2,556,598 | Rasine | June 12, 1951 |
| 2,586,721 | Rubin | Feb. 19, 1952 |
| 2,700,523 | Pollard | Jan. 25, 1955 |

FOREIGN PATENTS

| 618,296 | Great Britain | Feb. 18, 1949 |